United States Patent [19]

Ng et al.

[11] Patent Number: 5,198,910
[45] Date of Patent: Mar. 30, 1993

[54] MIXED MATRIX IMAGE PROCESSING FOR RENDERING HALFTONE IMAGES WITH VARIABLE DOT SIZES

[75] Inventors: Yee S. Ng, Fairport; Hwai T. Tai, Rochester, both of N.Y.

[73] Assignee: Eastman Kodak Company, Rochester, N.Y.

[21] Appl. No.: 794,367

[22] Filed: Nov. 13, 1991

Related U.S. Application Data

[62] Division of Ser. No. 450,795, Dec. 14, 1989.

[51] Int. Cl.$^5$ .............................................. H04N 1/40
[52] U.S. Cl. .................................. 358/456; 358/448; 358/455
[58] Field of Search ............... 358/443, 448, 454, 455, 358/456, 457, 458, 459, 462, 465

[56] References Cited

U.S. PATENT DOCUMENTS

| | | | |
|---|---|---|---|
| 3,922,484 | 11/1975 | Keller | 358/459 |
| 4,449,150 | 5/1984 | Kato | 358/456 |
| 4,866,534 | 9/1989 | Tada | 358/456 |

FOREIGN PATENT DOCUMENTS

| | | |
|---|---|---|
| 0126782 | 12/1984 | European Pat. Off. . |
| 0248616 | 12/1987 | European Pat. Off. . |

OTHER PUBLICATIONS

IEEE Transactions on Communications, vol. Com-29, No. 12, Dec. 1981, "A Survey of Electronic Techniques for Pictorial Image Reproduction", J. C. Stoffel and J. F. Moreland, pp. 1898–1925.

The Fourth International Congress on Advances in Non-Impact Printing Technologies, Peter A. Torpy, Mar. 20–25, 1988, pp. 380–383 "Obtaining More Gray Levels in a Halftoned Reproduction by Use of Pixel Overlap".

RCA Review–vol. 31, No. 3, Sep.1970, Princeton (U.S.) pp. 517–533; R. J. Klensch et al.; "Electronically Generated Halftone Pictures".

IEEE Transactions on Communications; vol. Com 29, No. 12; Dec. 1981; pp. 1898–1925; J. C. Stoffel et al.; "A Survey of Electronic Techniques for Pictorial Image Reproduction".

*Primary Examiner*—Stephen Brinich
*Assistant Examiner*—Thomas D. Lee
*Attorney, Agent, or Firm*—David A. Howley

[57] ABSTRACT

An image processing system renders halftone images with an increased number of gray level steps without increasing the number of sub-elements in the halftone cells. A document copying apparatus which generates a plurality of electrical image signals of successive picture elements of an original document compares input image signals representing low optical density picture elements of the original document to a series of threshold values selected from a two dimensional matrix halftone cell in which an output signal density pattern grows in a low spacial frequency manner; compares input image signals representing high optical density picture elements to a series of threshold values selected from a two dimensional matrix halftone cell in which an output signal density pattern grows in a high spacial frequency manner; and compares input image signals representing mid-optical density picture elements to a series of threshold values selected from the first or the second halftone cells according to the optical density of the picture element.

8 Claims, 6 Drawing Sheets

MIXED MATRIX IMAGE PROCESSING FOR RENDERING HALFTONE IMAGES WITH VARIABLE DOT SIZES

This is a division of application Ser. No. 07/450,795 filed Dec. 14, 1989.

BACKGROUND OF THE INVENTION

1. Technical Field

This invention relates generally to encoding pictorial imagery for reproduction on binary display and/or printing systems, and more particularly to increasing the number of discernible gray levels in halftone reproduction.

2. Background Art

Representation of the intensity, i.e., the gray level, of a color by binary displays and printers has been the object of a variety of algorithms. Binary displays and printers are capable of making a mark, usually in the form of a dot, of a given, uniform size and at a specified resolution in marks per unit length, typically dots per inch. It has been common to place the marks according to a variety of geometrical patterns such that a group of marks when seen by the eye gives a rendition of an intermediate color tone between the color of the background (usually white paper stock) and total coverage, or solid density.

Continuous tone images contain an apparent continuum of gray levels. Some scenes, when viewed by humans, may require more than 256 discrete gray levels to give the appearance of a continuum of gray levels from one shade to another.

As an approximation to continuous tone images, pictorial imagery is represented via halftone technologies. In order to record or display a halftone image with a scanning system, one picture element on the recording or display surface consists of a $j \times k$ matrix of sub-elements where $j$ and $k$ are positive integers. A halftone image is reproduced by printing the respective sub-elements or leaving them blank. That is, by suitably distributing the printed marks.

Halftone image processing algorithms are evaluated in part, by their capability of delivering a complete gray scale at normal viewing distances. The capability of a particular process to reproduce high frequency renditions (fine detail) with high contrast modulation makes that procedure superior to one which reproduces such fine detail with lesser or no output contrast.

Another measure of image processing algorithm merit is the tendency to produce visual details in the output image that are not part of the original image, but are the result of the image processing algorithm. Such details are called artifacts, and include moire patterns, false contours, and false textures. Moire patterns are false details created most often by the beating between two relatively high frequency processes resulting in a signal whose spacial frequency is low enough to be seen by the viewer. False contours are the result of gray scale quantization steps which are sufficiently large to create a visible contour when the input image is truly a smooth, gradual variation from one to the other. False textures are artificial changes in the image texture which occur when input gray levels vary slowly and smoothly and the output generates an artificial boundary between the textural patterns for one gray level and the textural patterns for the next gray level.

Briefly, several of the commonly used processing algorithms include fixed level thresholding, adaptive thresholding, orthographic tone scale fonts, and electronic screening. The present invention is concerned with the latter, electronic screening.

Figure 1:
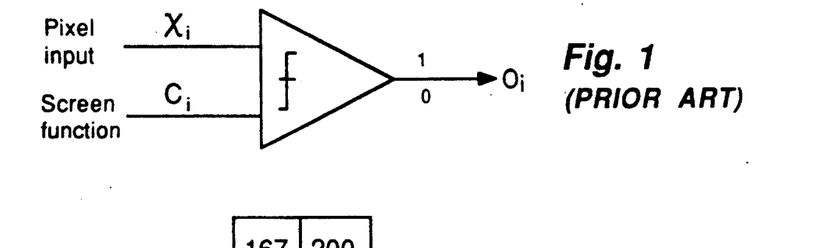
FIG. 1 is a schematic view of the electronic screening process known in the prior art.

FIG. 1 shows a schematic view of the electronic screening process. Signal $X_i$ represents the lightness or gray level information at a sampling point $i$ of an image. Input signal $X_i$ of sample image picture elements is compared with a series of threshold values $C_i$ selected in sequential order from a two-dimensional matrix defined to be the halftone cell threshold set, and a print/no-print decision is made. The series of threshold values and their arrangement within the threshold set determine the gray scale range, the frequency, angle, and other properties of the halftone pictorial image. Each threshold level $C_i$ is determined by a comparison $j \times k$ matrix. When the input signal $X_i$ exceeds the threshold level $C_i$, the corresponding sub-element is determined to have a print level or logic level "ONE". By comparing the input signal $X_i$ with the threshold levels, $j \times k$ output signals $O_i$ are produced. A density pattern consisting of a combination of $j \times k$ sub-elements is obtained by dividing each picture element into $j \times k$ sub-elements and systematically printing them or leaving them blank.

Figure 2:
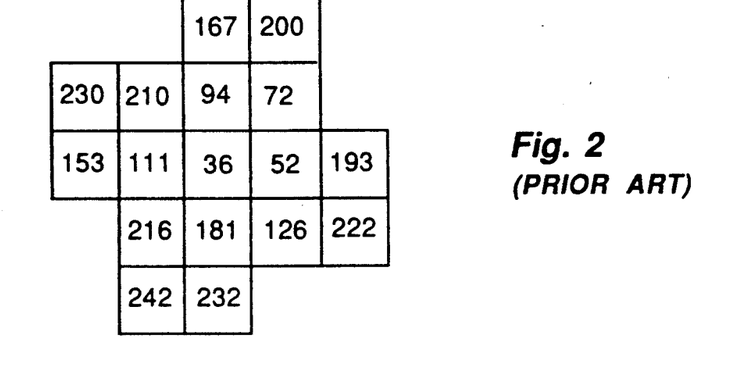
FIG. 2 is a typical electronic halftone function unit cell known in the prior art.
Figure 3:
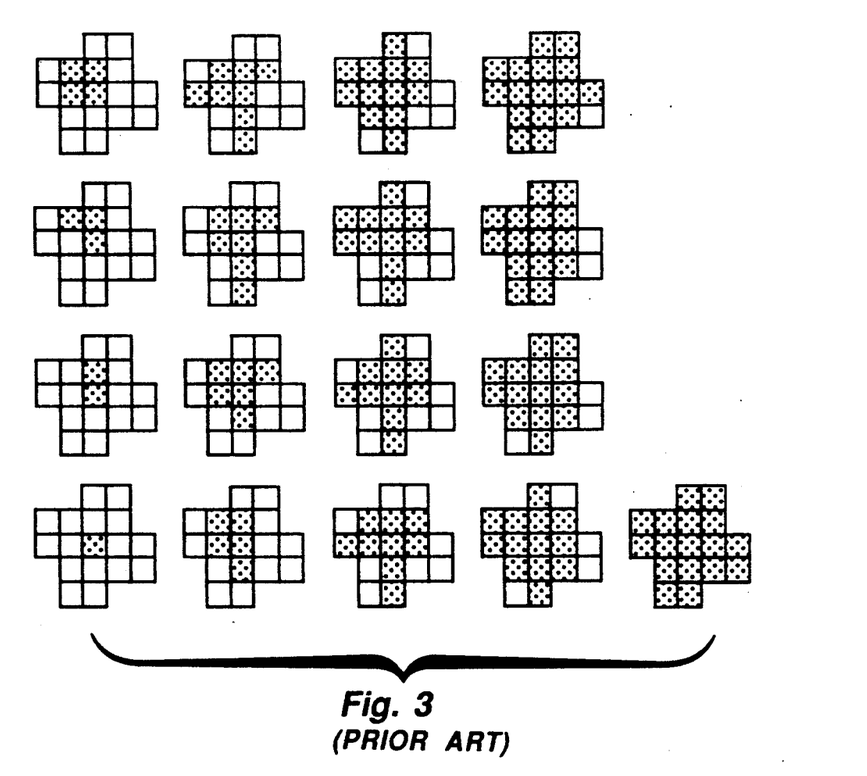
FIG. 3 is a view of the possible halftone patterns of the unit cell of FIG. 2.

FIG. 2 shows a typical two dimensional matrix halftone cell for electronic halftoning with 18 possible gray levels, used as a 45° angular screen. When the cell is repeated horizontally and vertically, it creates the entire screen function. FIG. 3 shows the possible "nonwhite" halftone sub-elements which may be generated by the screen function of FIG. 2.

A problem exists with the number of density levels attainable with a limited resolution and acceptable screen frequency. A 94.5 lines per inch, 45° screen using a 400 dpi system results in nineteen level halftoning, including white. Nineteen levels is not generally sufficient; more gradations being preferred. One way to get more gray levels is to reduce the number of lines per inch, but this decreases the screen frequency to a visible level.

Various screen functions have been proposed for electronic screening to minimize the number of gray levels required to manifest acceptable pictorial imagery. These existing types of screen functions, also referred to as "threshold value matrices," are roughly divided into the following two groups: (1) those in which sub-elements grow around the center core and (2) those in which the spatial frequency of the sub-elements is made to be as high as possible.

Figure 4:
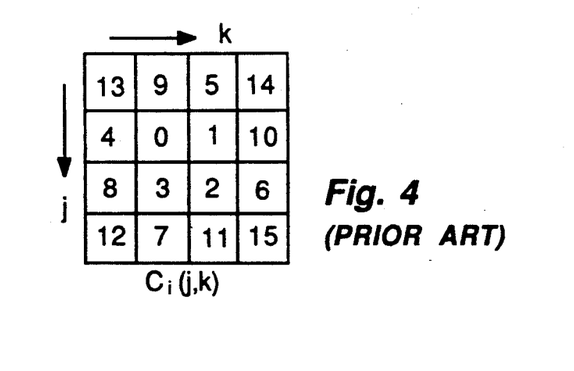
FIG. 4 is a 4×4 electronic halftone dot concentration function unit cell known in the prior art.
Figure 5:
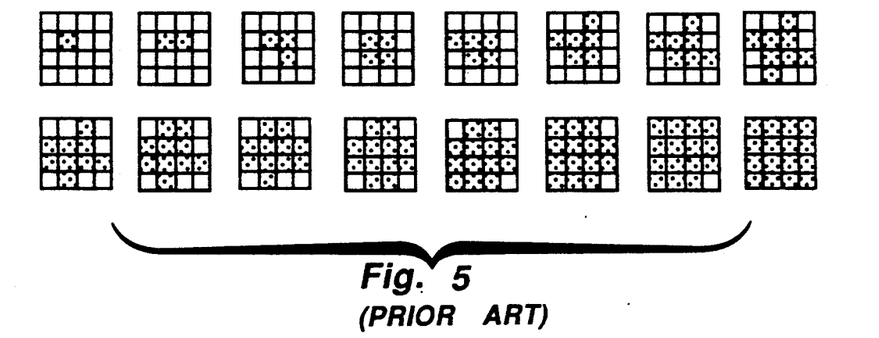
FIG. 5 is a view of the possible halftone patterns of the unit cell of FIG. 4.

Group-1 screen functions are generally known as "fattening" or "dot concentration" type functions. FIG. 4 is a 4×4 group-1 matrix. As shown in FIG. 5, sixteen gray levels (plus all white) are obtained by sequentially increasing the number of sub-elements which are printed in black.

Figure 6:
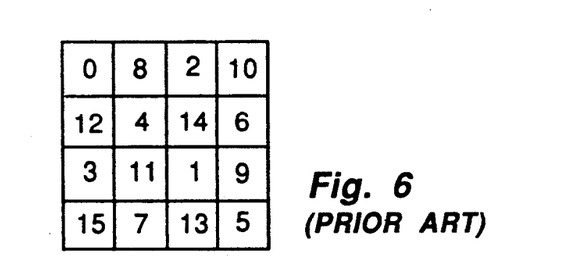
FIG. 6 is a 4×4 electronic halftone dot dispersion function unit cell known in the prior art.
Figure 7:
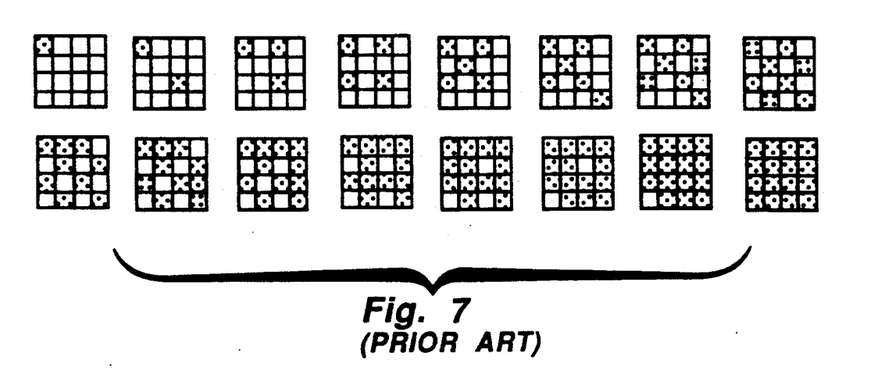
FIG. 7 is a view of the possible halftone patterns of the unit cell of FIG. 6.

Group-2 screen functions are known generally as "dot dispersion" type. The best known dot dispersion type screen functions were developed by Bayer, Lippel, and Jarvis. FIG. 6 is typical a 4×4 group-2 matrix. As shown in FIG. 7, sixteen gray levels (plus all white) are obtained by sequentially increasing the number of sub-elements which are printed.

DISCLOSURE OF INVENTION

It has been found that by arranging the sub-elements differently in a cell, different apparent densities are attainable; even though the same number of sub-elements are present in each pattern. For example, a six-dot group-1 pattern in a 4×4 cell will have a different apparent density than a six-dot group-2 pattern in a similar cell.

This is caused by the fact that in a group-2 matrix, the sub-elements are dispersed in a manner to create a high spacial frequency so that the overlap of the sub-elements are minimal, whereas in a group-1 matrix, the sub-elements are grouped together so that there is greater overlap. Therefore the sub-elements of a group-1 matrix will cover less area than an equal number of sub-elements in a group-2 matrix.

Employing this characteristic, it is an object of the present invention to provide image processing for rendering halftone images with an increased number of gray level steps without increasing the number of sub-elements in the halftone cells.

According to the present invention, a document copying apparatus includes: means for comparing input image signals representing low optical density picture elements of the original document to a series of threshold values selected in sequential order from a first two dimensional matrix halftone cell in which an output signal density pattern grows in a low spacial frequency manner; means for comparing input image signals representing high optical density picture elements of the original document to a series of threshold values selected in sequential order from a second two dimensional matrix halftone cell in which an output signal density pattern grows in a high spacial frequency manner; and means for comparing input image signals representing mid-optical density picture elements of the original document to a series of threshold values selected in sequential order from the first or the second two dimensional matrix halftone cells according to the optical density of the picture element.

According to another feature of the present invention, document copying apparatus includes: means for comparing input image signals representing picture elements in low optical density areas of the original document to a series of threshold values selected in sequential order from a first two dimensional matrix halftone cell in which an output signal density pattern grows in a low spacial frequency manner; means for comparing input image signals representing picture elements in high optical density areas of the original document to a series of threshold values selected in sequential order from a second two dimensional matrix halftone cell in which an output signal density pattern grows in a high spacial frequency manner; and means for comparing input image signals representing picture elements in mid-optical density areas of the original document to a series of threshold values selected in sequential order from the first or the second two dimensional matrix halftone cells according to the optical density of the area of the picture element.

According to yet another feature of the present invention, apparatus for reproducing a gray level image in a bi-tonal medium includes means for comparing a picture element value with a threshold value to make a print or no-print decision characterized by a corresponding one of two print values; a first dot concentration type two dimensional matrix halftone cell set; a second dot dispersion type two dimensional matrix halftone cell set; and means for selecting the threshold value from the first set when the picture element is of low density level; for selecting the threshold value from the second set when the picture element is of high density level; and for selecting the threshold value from the first or the second sets when the picture element is of mid-density level.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

BEST MODE FOR CARRYING OUT THE INVENTION

The present description will be directed in particular to elements forming part of, or cooperating more directly with, apparatus in accordance with the present invention. It is to be understood that elements not specifically shown or described may take various forms well known to those skilled in the art.

It has been recognized that the apparent density produced by a group-1 matrix as a function of the number of printed sub-elements differs from the apparent density produced by a group-2 matrix for the same number of printed sub-elements. Further, the difference in apparent density between the group-1 and group-2 matrices changes with the density range.

Figure 8:
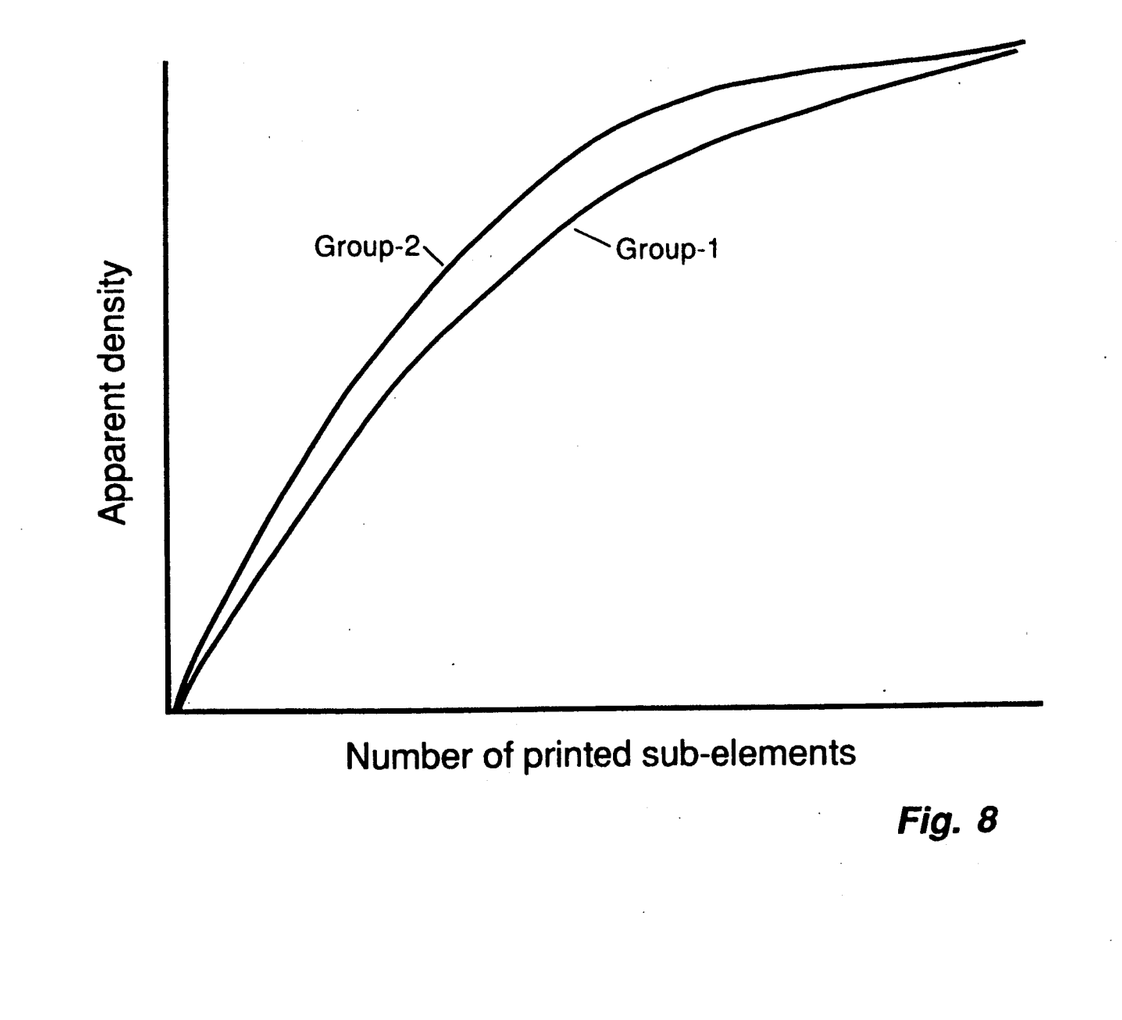
FIG. 8 is a comparison of the apparent density produced by the unit cells of FIG. 4 and FIG. 6.

FIG. 8 is a comparison of the apparent density produced by group-1 and group-2 matrices as a function of the number of sub-elements which are printed. As can be seen from the figure, the slope of the group-1 matrix curve is greater in the high density portion of the curve, and the slope of the group-2 matrix curve is greater in the low density portion of the curve.

Since their density slopes are less in low density regions, group-1 matrices exhibit more observable density levels, and therefore less density contouring, at low densities than group-2 matrices because the group-2 matrix tone scale is compressed, resulting in rapid low density rise (high contrast). Accordingly, group-1 matrices would be preferred at low densities. On the other hand, group-2 matrices exhibit more observable density levels, and therefore less density contouring, at high densities than group-1 matrices because the type 1 matrix tone scale is compressed at these densities, resulting in rapid high density rise (high contrast). Accordingly, group-2 matrices would be preferred at high densities. Accordingly, the present invention provides for mixing group-1 and group-2 matrices so that a group-1 matrix is used in low density areas of the image and a group-2 matrix is used in high density areas of the image. Good results have been observed when the cut between group-1 and group-2 matrices have been made at density levels of between 60 and 80 on a 255 gray level scale.

Figure 9:
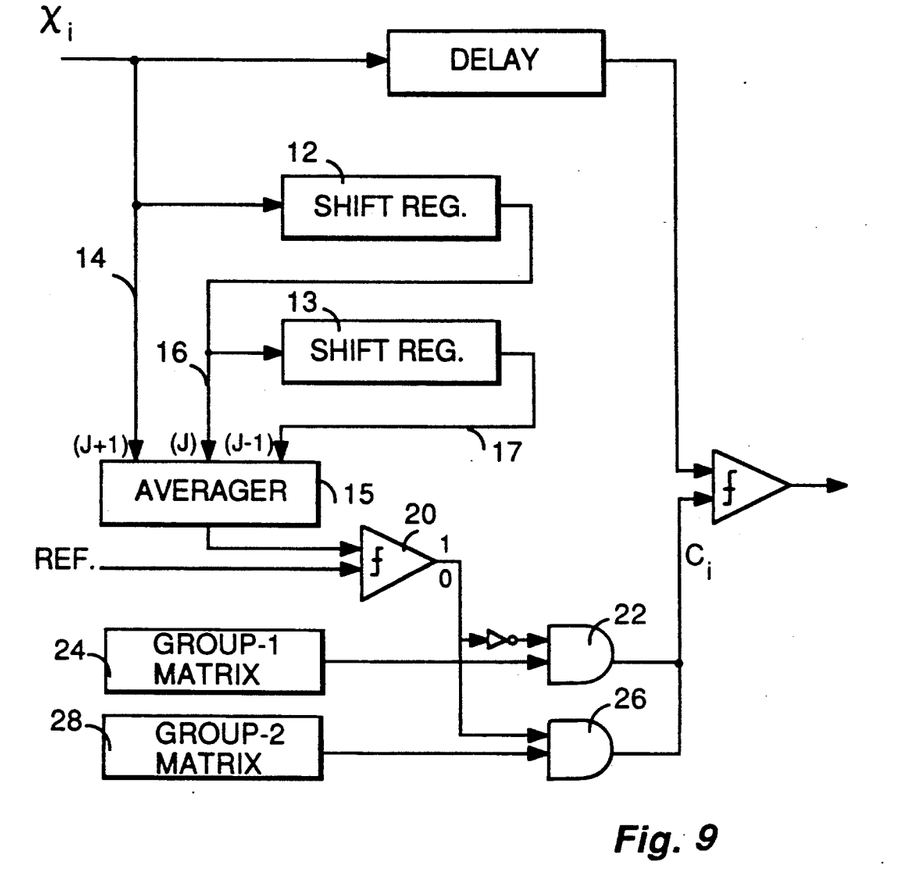
FIG. 9 is a schematic view of the electronic screening process according to a preferred embodiment of the present invention.

FIG. 9 is a schematic view of the electronic screening process for switching between group-1 and group-2 matrices according to the average density of an area. As a scan line, designated $(J-1)$, of the input signal $X_i$ is scanned, the electrical signals representing the density for each successive picture element along the scan line are stored in an analog shift register 12. As the next scan line, designated J, is scanned, the electrical signals from that line replace those of the preceding scan line in register 12, and the replaced signals are shifted into a second shift register 13.

Now, as the next line, designated $(J+1)$, is scanned, its electrical signals replace those from line J in register 12 and are simultaneously applied along a conductor 14 to an average 15. The signal outputs from register 12 replace those from the $(J-1)$ line in register 13 and are simultaneously applied along conductor 16 to averager 15. Simultaneously, the signals from scan line $(J-1)$ shift from register 13 along a conductor 17 to averager 15.

It is now seen that averager 15 of FIG. 9 serially receives the electrical signals from scan lines $(J+1)$, J, and $(J-1)$, with all three inputs synchronized such that the corresponding samples from each scan line arrive simultaneously.

Figure 10:
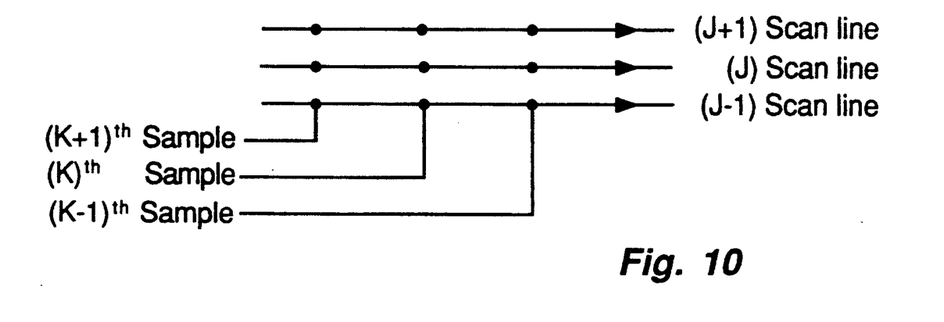
FIG. 10 is a schematic view of the timing of signals generated in the screening process of FIG. 9.

Referring for the moment to FIG. 10, averager 15 of FIG. 9 compares the amplitude of the nine adjacent samples in a two-dimensional array of sampled information. FIG. 10 depicts samples $(J+1,K+1)$, $(J+1,K)$, and $(J+1,K-1)$ from scan line $(J+1)$; samples $(J,K+1)$, $(J,K)$, and $(J,K-1)$ from scan line J; and $(J-1,K+1)$, $(J-1,K)$, and $(J-1K-1)$ from scan line $(J-1)$.

Referring back to FIG. 9, a comparator 20 compares the averaged density signal from averager 15 with a reference threshold level determined on the basis of the density level selected for switching between group-1 and group-2 matrices. At low average density levels, the output of comparator 20 is a logical zero which, when inverted and applied to an AND gate 22, causes the threshold level $C_i$ to be selected in sequential order from a two-dimensional group-1 matrix 24. At high average density levels, the output of comparator 20 is a logical "ONE" which when applied to AND gate 22 causes the threshold level $C_i$ to be selected in sequential order from a two-dimensional group-2 matrix 28.

FIG. 8, which is not to scale, shows this graphically by plotting the apparent density verses the number of printed sub-elements for group-1 and group-2 matrices. For group-2 matrices, the density rises quickly at low densities and has a lower slope at maximum densities. In the case of group-1 matrices, the density rises more slowly at low densities and has a greater slope at maximum densities.

Figure 11:
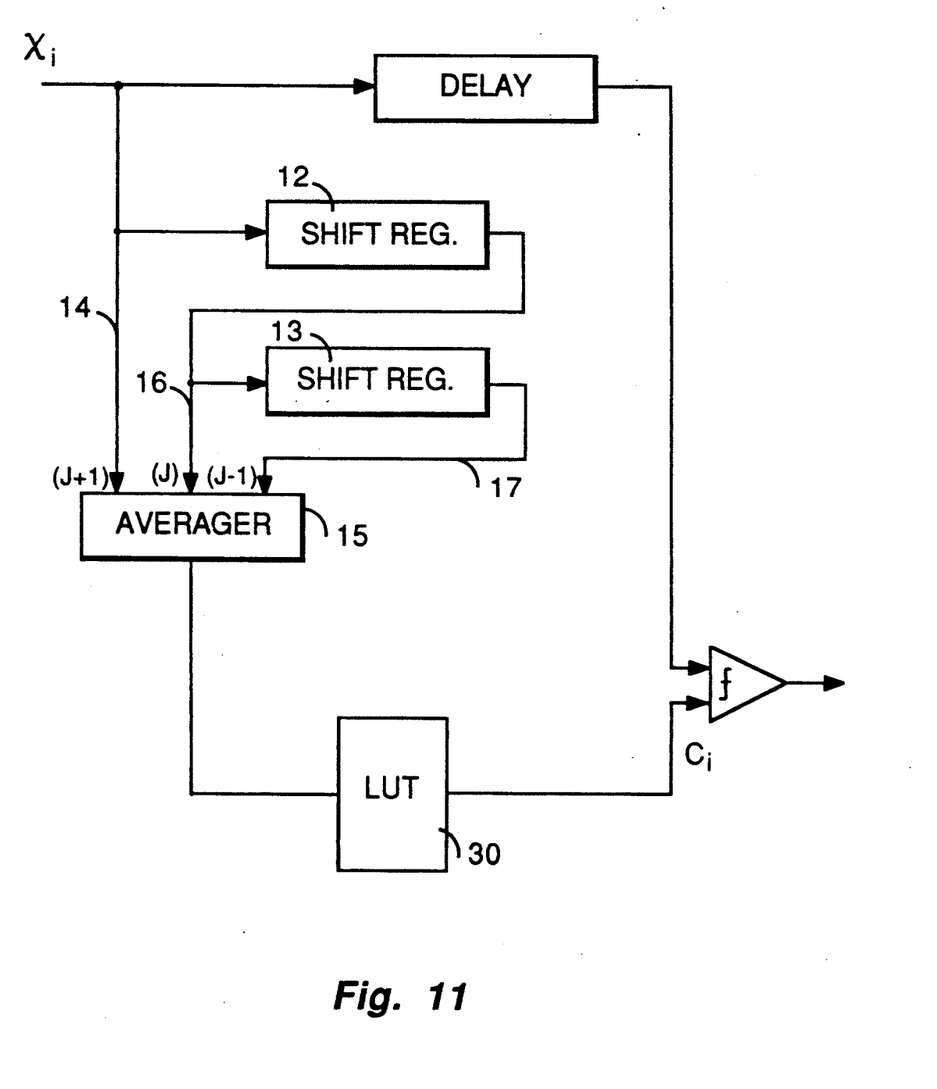
FIG. 11 is a schematic view of the electronic screening process according to another preferred embodiment of the present invention.

It is apparent that in the mid-density range, a given number of printed sub-elements will have different apparent densities for different matrix types. In accordance with another embodiment of the present invention illustrated in FIG. 11, this characteristic is used to attain an even greater number of gray scale levels by mixing the matrices in the mid-density range.

Figure 12:
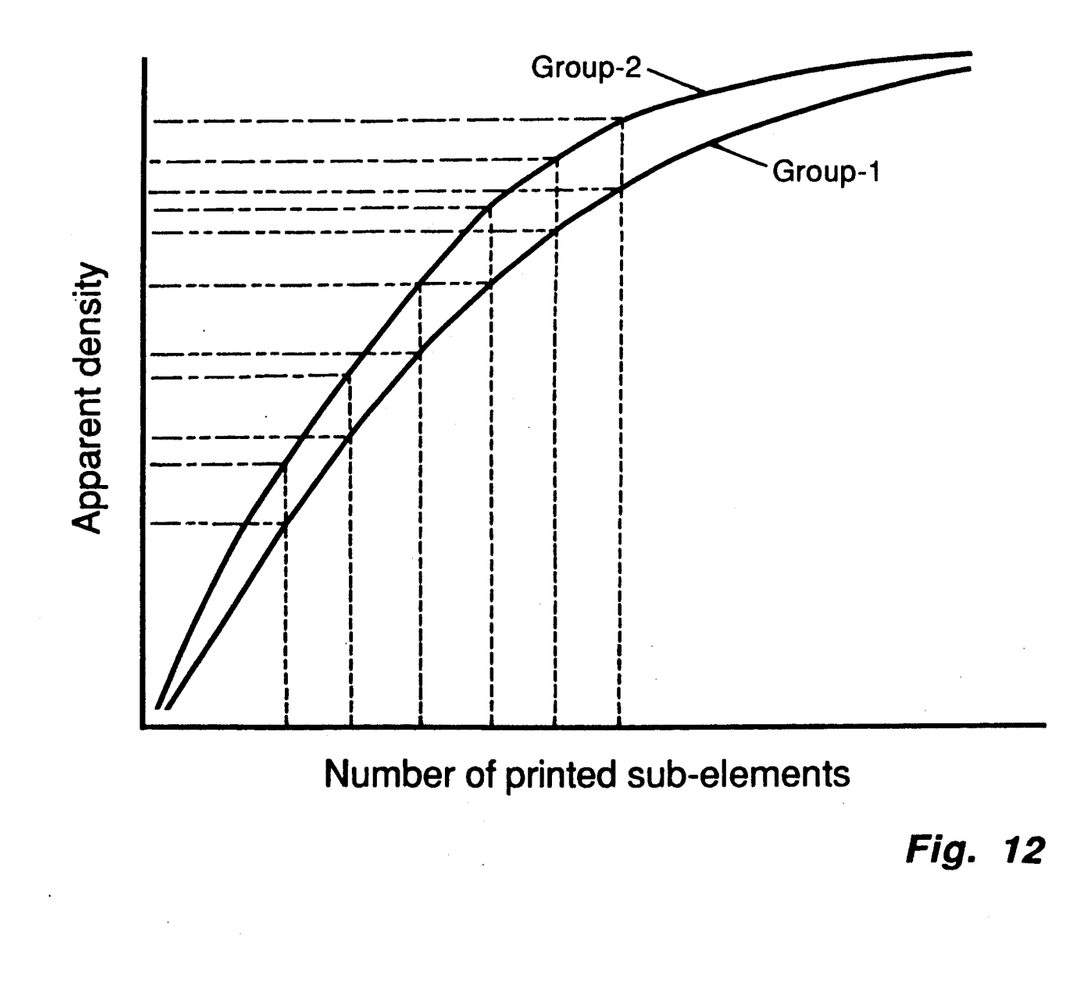
FIG. 12 is a comparison of the apparent density produced by the screening process of FIG. 11.

For example, there are illustrated in FIG. 12, six different vertical lines representing different number of printed sub-elements. The intersections of the vertical lines with the density curves for group-1 and group-2 matrices are brought to the density scale where, going from bottom to top, eleven different densities are attainable by switching between matrices in the sequence 1,2,1,2,1,1 or 2,2,1,2,1,1. It should be noted that as many as twelve different densities are theoretically possible, but it is at least possible that there will be overlap between a dot pattern of one matrix and a dot pattern of the other matrix, as is seen between the third vertical line of the group-2 matrix and the forth vertical line of the group-1 matrix.

While it would be possible to use the mixed-dot process for the entire range, selecting between matrices for each density; the fact that there are more steps in the low density range for a group-1 matrix and more steps in the high density range for a group-2 matrix can be exploited by using concentrated dot in the low density range and dispersion dot in the high density range. In the mid-region, both groups are mixed in accordance with a look up table 30 of FIG. 11. The input to the table is the average gray level value of a sample image picture elements. The look up table will provide an output indicating the number of sub-elements to be printed and the matrix to be used for that gray level value.

The invention has been described in detail with particular reference to preferred embodiments thereof, but it will be understood that variations and modifications can be effected within the spirit and scope of the invention.

What is claimed is:

1. A document copying apparatus of the type which generates a plurality of electrical image signals which are serial measures of imagewise information of successive picture elements of an original document to be reproduced, said apparatus comprising:

means for comparing input image signals representing low optical density picture elements of the original document to a series of threshold values selected in sequential order from a first two-dimensional matrix halftone cell in which an output signal density pattern grows in a low spatial frequency manner;

means for comparing input image signals representing high optical density picture elements of the original document to a series of threshold values selected in sequential order from a second two-dimensional matrix halftone cell in which an output signal density pattern grows in a high spatial frequency manner; and means for comparing input image signals representing mid-optical density picture elements of the original document to a series of threshold values selected in sequential order from said first or said second two-dimensional matrix halftone cells according to the optical density of the picture element such that at least one image signal, representing a first picture element having a higher optical density than a second picture element, is compared to a series of threshold values selected in sequential order from said first two-dimensional matrix halftone cell, and an image signal representing said second picture element is compared to a series of threshold values selected in sequential order from said second two-dimensional matrix halftone cell, whereby image signals representing mid-optical density picture elements compared to threshold values selected from said first cell are interspersed with mid-optical density picture elements compared to threshold values selected from said second cell.

2. A document copying apparatus as set forth in claim 1 wherein the printed sub-elements of the matrix halftone cell in which an output signal density pattern grows in a low spacial frequency manner grow around a core.

3. A document copying apparatus as set forth in claim 1 wherein the printed sub-elements of the matrix halftone cell in which an output signal density pattern grows in a low spacial frequency manner grow around a core central to the cell.

4. A document copying apparatus as set forth in claim 1 wherein low density is defined to be optical densities below about 60 on a 256 grey level scale.

5. A document copying apparatus as set forth in claim 1 wherein low density is defined to be optical densities below about 80 on a 256 grey level scale.

6. A document copying apparatus of the type which generates a plurality of electrical image signals which are serial measures of imagewise information of successive picture elements of an original document to be reproduced, said apparatus comprising:
   means for comparing input image signals representing picture elements in low optical density area of the original document to a series of threshold values selected in sequential order from a first two-dimensional matrix halftone cell in which an output signal density pattern grows in a low spatial frequency manner;
   means for comparing input image signals representing picture elements in high optical density areas of the original document to a series of threshold values selected in sequential order from a second two-dimensional matrix halftone cell in which an output signal density pattern grows in a high spatial frequency manner; and
   means for comparing input image signals representing picture elements in mid-optical density areas of the original document to a series of threshold values selected in sequential order from said first or said second two-dimensional matrix halftone cells according to the optical density of the area of the picture element such that at least one image signal, representing a first picture element having a higher optical density than a second picture element, is compared to a series of threshold values selected in sequential order from said first two-dimensional matrix halftone cell, and an image signal representing said second picture element is compared to a series of threshold values selected in sequential order from said second two-dimensional matrix halftone cell, whereby image signals representing mid-optical density picture elements compared to threshold values selected from said first cell are interspersed with mid-optical density picture elements compared to threshold values selected from said second cell.

7. A document copying apparatus as set forth in claim 6 further comprising means for averaging the optical density of picture elements in said areas of the original document.

8. Apparatus for reproducing a gray level image in a bi-tonal medium, said apparatus comprising:
   means for comparing a picture element value with a threshold value to make a print or no-print decision characterized by a corresponding one of two print values;
   a first dot concentration type two-dimensional matrix halftone cell set;
   a second dot dispersion type two-dimensional matrix halftone cell set; and
   means for selecting said threshold value from said first set when the picture element is of low density level; for selecting said threshold value from said second set when the picture element is of high density level; and for selecting said threshold value from said first or said second sets when the picture element is of mid-density level such that at least one threshold value is selected from said first set for a first picture element having a higher optical density than a second picture element, and a threshold value for said second picture element is selected from said second set.

* * * * *